United States Patent [19]
Kikuchi

[11] Patent Number: 6,094,540
[45] Date of Patent: *Jul. 25, 2000

[54] APPARATUS ADAPTED TO USE SOLAR BATTERY

[75] Inventor: Hiroshi Kikuchi, Kanagawa-ken, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/980,184

[22] Filed: Nov. 26, 1997

Related U.S. Application Data

[63] Continuation of application No. 08/589,418, Jan. 22, 1996, abandoned.

[30] Foreign Application Priority Data

Jan. 26, 1995 [JP] Japan .................................. 7-010622

[51] Int. Cl.⁷ .............................. G03B 7/26; G03B 17/02; H01L 25/00; H04M 1/00
[52] U.S. Cl. ........................... 396/304; 396/535; 136/245; 379/428
[58] Field of Search ..................................... 396/535–536, 396/539, 301, 304; 136/245, 246; 379/428, 433, 440

[56] References Cited

U.S. PATENT DOCUMENTS

| | | | |
|---|---|---|---|
| 4,421,943 | 12/1983 | Withjack | 136/246 |
| 4,451,514 | 5/1984 | Hunt | 296/211 |
| 4,475,764 | 10/1984 | Hutchinson et al. | 296/136 |
| 4,513,548 | 4/1985 | Parker | 52/202 |
| 4,616,456 | 10/1986 | Parker | 52/202 |
| 4,860,040 | 8/1989 | Tamamura et al. | 354/195.1 |
| 4,916,642 | 4/1990 | Kaiser et al. | 364/550 |
| 4,925,238 | 5/1990 | Thaler | 196/218 |
| 4,940,283 | 7/1990 | Androy | 296/216 |
| 5,009,465 | 4/1991 | Induni | 296/219 |
| 5,059,254 | 10/1991 | Yaba et al. | 136/251 |
| 5,185,621 | 2/1993 | Kagechika | 354/234.1 |
| 5,260,885 | 11/1993 | Ma | 364/708.1 |
| 5,270,754 | 12/1993 | Newman | 354/149.11 |
| 5,792,279 | 8/1998 | Tsuboi et al. | 136/245 |

FOREIGN PATENT DOCUMENTS

| | | | |
|---|---|---|---|
| 0726487 | 8/1996 | European Pat. Off. | G03B 17/02 |
| 86-184384 | 8/1986 | Japan | F24F 7/06 |
| 96-203262 | 8/1996 | Japan | G11B 33/14 |

OTHER PUBLICATIONS

Charley's Greenhouse Supplies 1998 Catalog and Product Guide, www.charleysgreenhouse.com, Apr. 20, 1998.

*Primary Examiner*—Safet Metjahic
*Assistant Examiner*—Christopher Mahoney
*Attorney, Agent, or Firm*—Robin, Blecker & Daley

[57] ABSTRACT

An apparatus adapted to use a solar battery or an apparatus applied to such an apparatus comprises a first cover which is provided on the apparatus adapted to use the solar battery, a second cover which is provided on the apparatus adapted to use the solar battery and which is capable of moving independently of the first cover, and an opening device for opening both of the first and second covers when a temperature rise occurs.

24 Claims, 6 Drawing Sheets

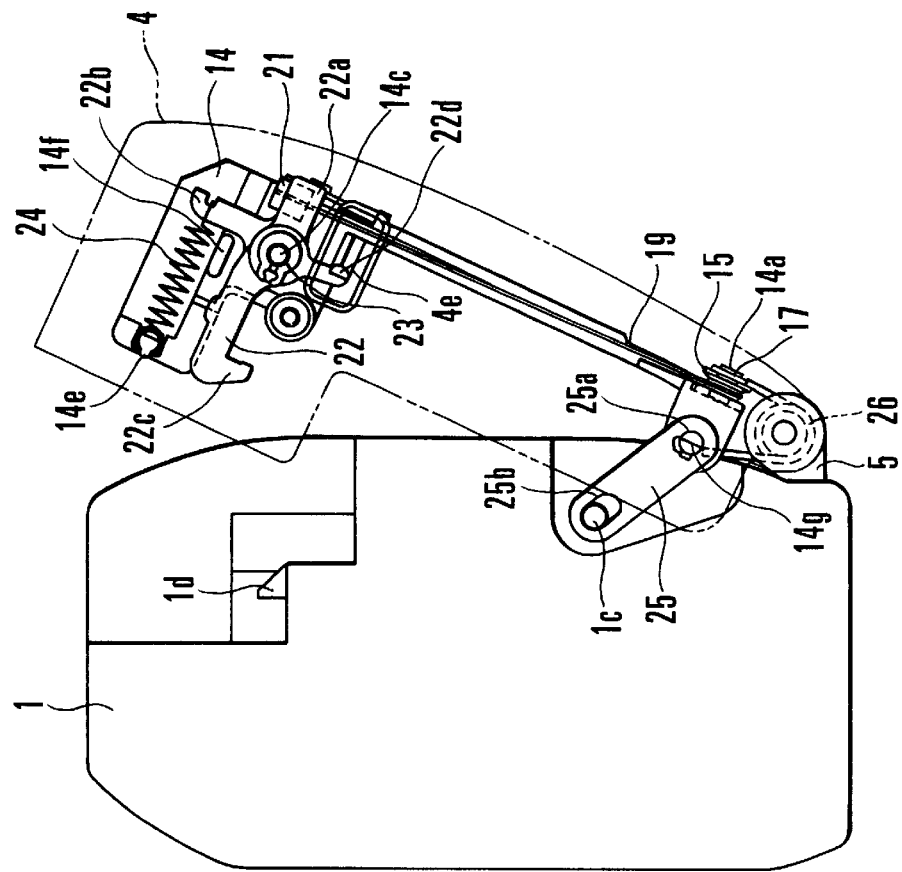
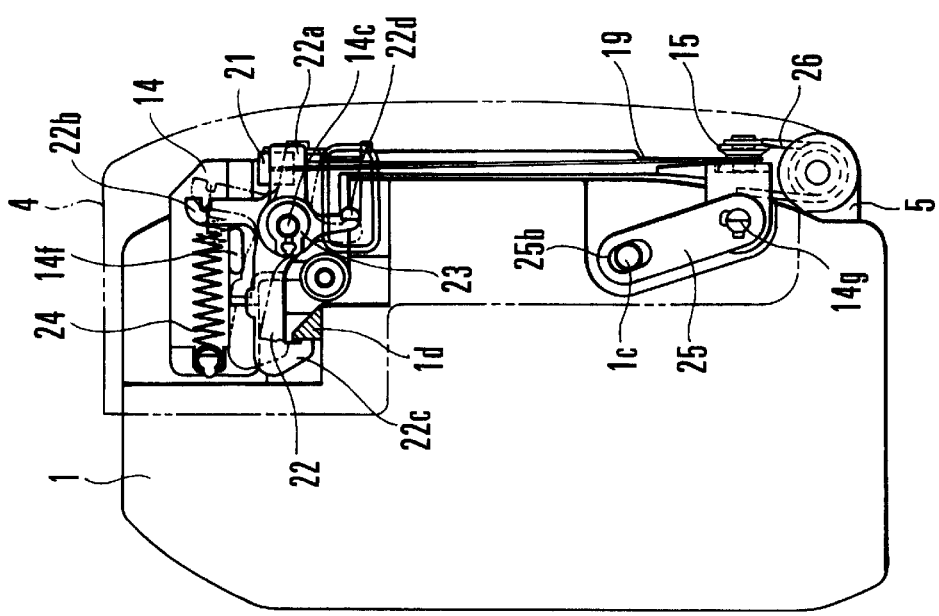
FIG.3(a)
FIG.3(b)

FIG. 4(a)
FIG. 4(b)
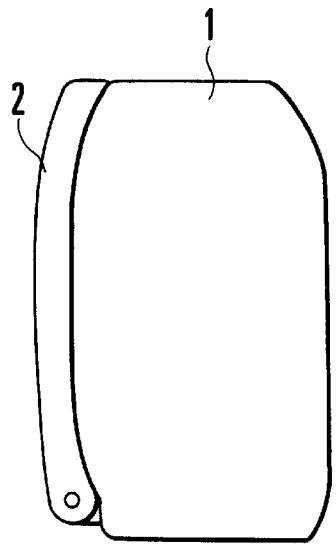
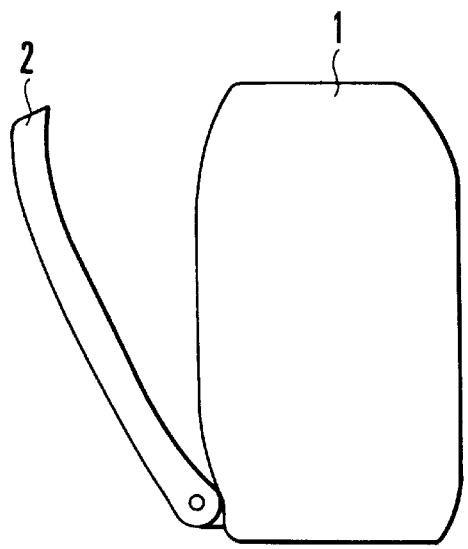
FIG. 4(c)
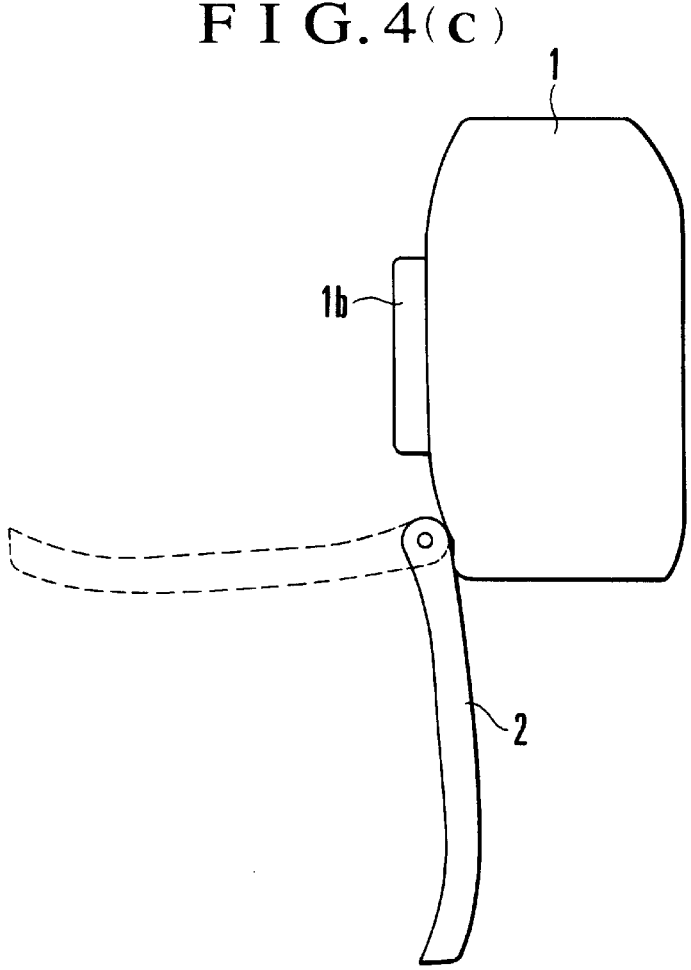

APPARATUS ADAPTED TO USE SOLAR BATTERY

This is a continuation application under 37 CFR 1.62 of prior application Ser. No. 08/589,418, filed Jan. 22, 1996, now abandon entitled, APPARATUS ADAPTED TO USE SOLAR BATTERY

BACKGROUND OF THE INVENTION

1. Field of the Invention

The present invention relates to an apparatus, such as a camera, which is adapted to use a solar battery.

2. Description of the Related Art

Various proposals have heretofore been made with respect to a solar-battery type of portable electronic apparatus which is arranged to be driven by the electrical power generated by the solar battery. Japanese Laid-Open Patent Application No. Sho 63-160056 discloses a heat insulating or radiating structure for the body of such an electronic apparatus. According to the disclosed structure, the body of the electronic apparatus is removably provided with a secondary battery and a solar battery as an integrated component. To charge the secondary battery with energy, the secondary battery and the solar battery are removed from the body of the electronic apparatus and the solar battery is placed under the sun to generate electrical power. This is because the body of the electronic apparatus can be prevented from being overheated by direct exposure to sunlight during power generation.

Another new proposal which relates to such an electronic apparatus provided with a solar battery is disclosed in U.S. patent application Ser. No. 08/257,117 filed on Jun. 8, 1994. This proposal is intended to prevent the electronic apparatus from being overheated during power generation by a solar battery. Specifically, according to the proposal, an air layer is provided between a panel which holds a solar battery and the body of the electronic apparatus which has a built-in solar battery, whereby the body of the electronic apparatus is cooled by natural convection occurring in the air layer.

However, the structure of the related art disclosed in Japanese Laid-Open Patent Application No. Sho 63-160056 has a number of problems: (i) it is necessary to use a complicated mechanism for removably attaching a battery holder for the solar battery and the secondary battery to the body of the electronic apparatus; (ii) a contact or terminal part for providing electrical connection between the body of the electronic apparatus and the battery holder is easily contaminated to cause a conduction failure; (iii) a user may forget to remove the battery holder from the body of the electronic apparatus, with the result that not only the battery holder but also the body of the electronic apparatus may be left in direct sunshine to cause a malfunction in the body; and (iv) since the secondary battery and the solar battery are integrated, not only the solar battery but also the secondary battery is exposed to the direct rays of the sun during power generation, so that the secondary battery may be degraded and suffer a decrease in charging capacity or life. Recently, a lithium-ion battery which has characteristics suitable for use in combination with solar batteries have become popular as a secondary battery. As compared with a conventional nickel-cadmium battery, the lithium-ion battery is free from a memory effect and does not easily self-discharge, but has characteristics which are easily affected by high temperatures. For this reason, if such a lithium-ion battery is used as a secondary battery, the above-described structure itself will inherently be defective.

On the other hand, in the above-described structure proposed in U.S. patent application Ser. No. 08/257,117, since the secondary battery is built in the body of the electronic apparatus, the secondary battery is prevented from being heated by the direct rays of the sun together with the solar battery, but the body of the electronic apparatus does not have a sufficient heat insulation structure. Accordingly, to prevent the body of the electronic apparatus from being heated, it is necessary to protect not only the secondary battery but also the internal portion of the body of the electronic apparatus that is easily affected by heat.

SUMMARY OF THE INVENTION

According to one aspect of the present invention, an apparatus adapted to use a solar battery or an apparatus applied to such an apparatus comprises a first cover which is provided on the apparatus adapted to use the solar battery, a second cover which is provided on the apparatus adapted to use the solar battery and which is capable of moving independently of the first cover, and an opening device for opening both of the first and second covers when a temperature rise occurs, whereby such an apparatus can be prevented from being adversely affected by heat due to light rays to which the solar battery is exposed.

Other aspects of the present invention will become apparent from the following detailed description of preferred embodiments of the present invention, taken in conjunction with the accompanying drawings.

BRIEF DESCRIPTION OF THE DRAWINGS

FIG. 3(a) is a side elevational view showing a state in which a solar cover 2 and a grip cover 4 are located close to the camera body 1 of the camera;

FIG. 3(b) is a side elevational view showing a state in which the solar cover 2 and the grip cover 4 are located away from the camera body 1;

FIG. 4(a) is a schematic side elevational view showing a state in which the solar cover 2 is located close to the camera body 1;

FIG. 4(b) is a schematic side elevational view showing a state in which the solar cover 2 is located away from the camera body 1;

FIG. 4(c) is a schematic side elevational view showing a photography-enabled state of the camera;

DETAILED DESCRIPTION OF THE PREFERRED EMBODIMENTS

Preferred embodiments of the present invention will be described below in detail with reference to the accompanying drawings.

FIGS. 1 to 6 show a first embodiment of the present invention. The first embodiment relates to an example of a camera to which the present invention is applied, but the range of application of the present invention is not limited to only the camera and encompasses various other apparatuses such as portable telephones, radios and portable computers.

Figure 1:
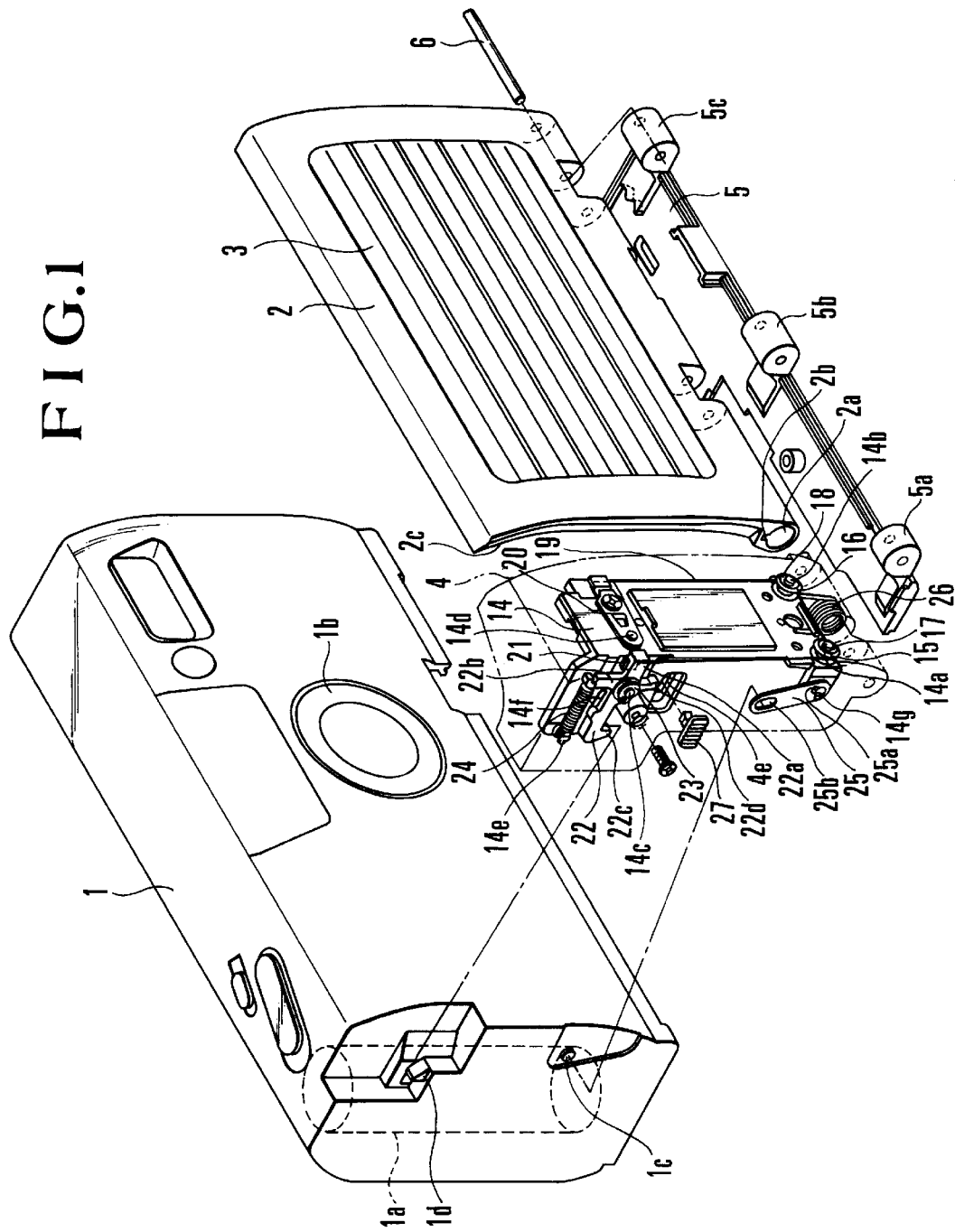
FIG. 1 is an exploded perspective view showing in partly transparent form a camera according to a first embodiment of the present invention.
Figure 2:
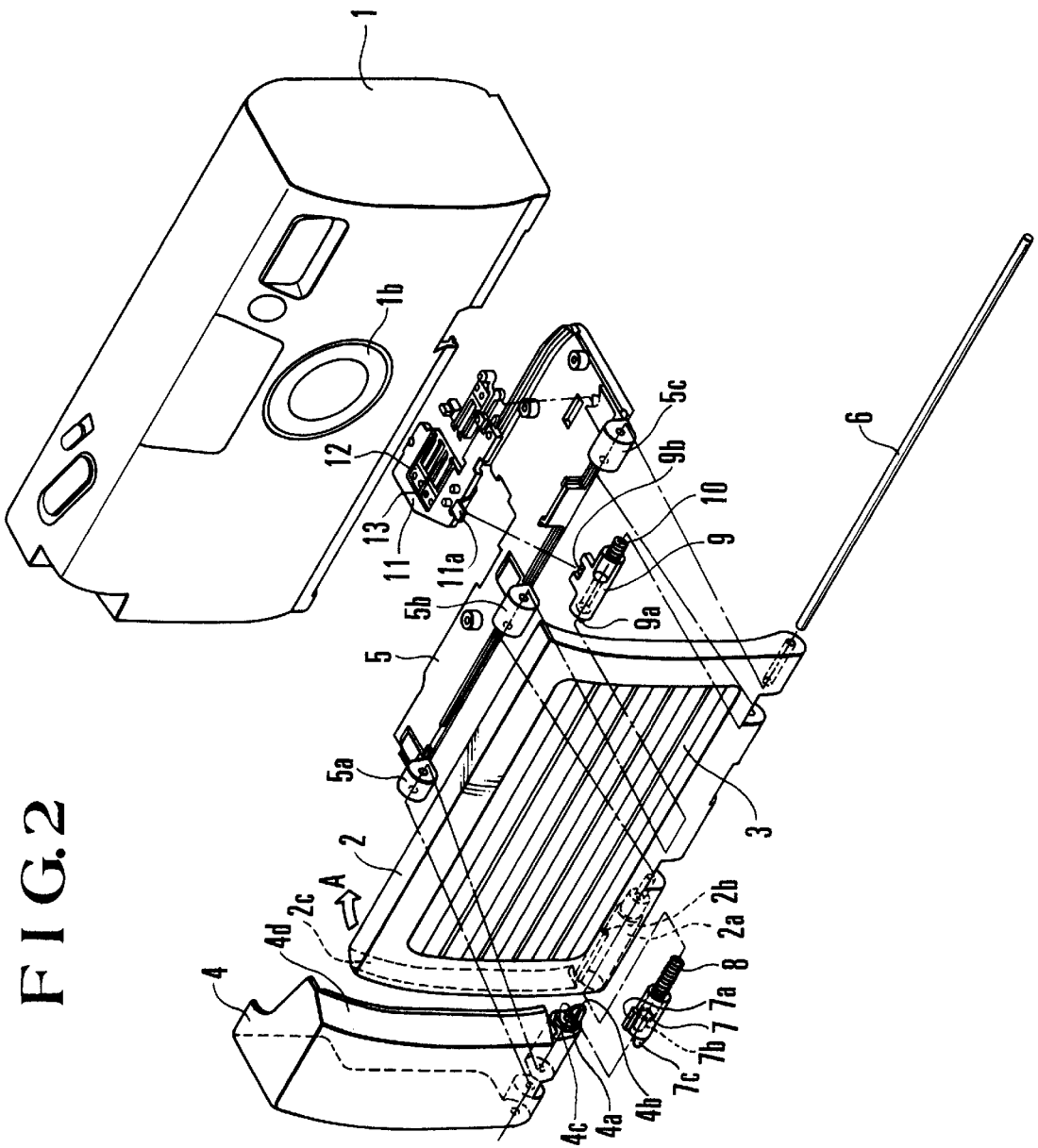
FIG. 2 is an exploded prospective view showing an essential portion of the camera.
Figure 5:
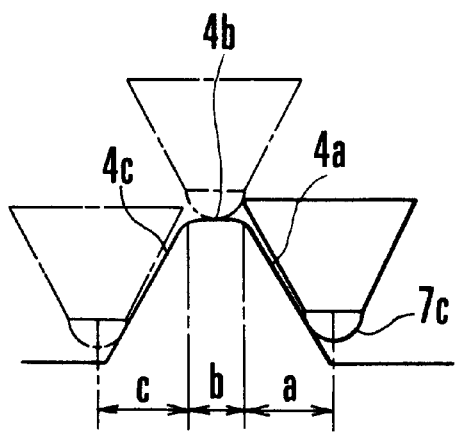
FIG. 5 is a schematic enlarged view aiding in describing the movement of a part of the structure shown in FIGS. 3(a) and 3(b)
Figure 6:
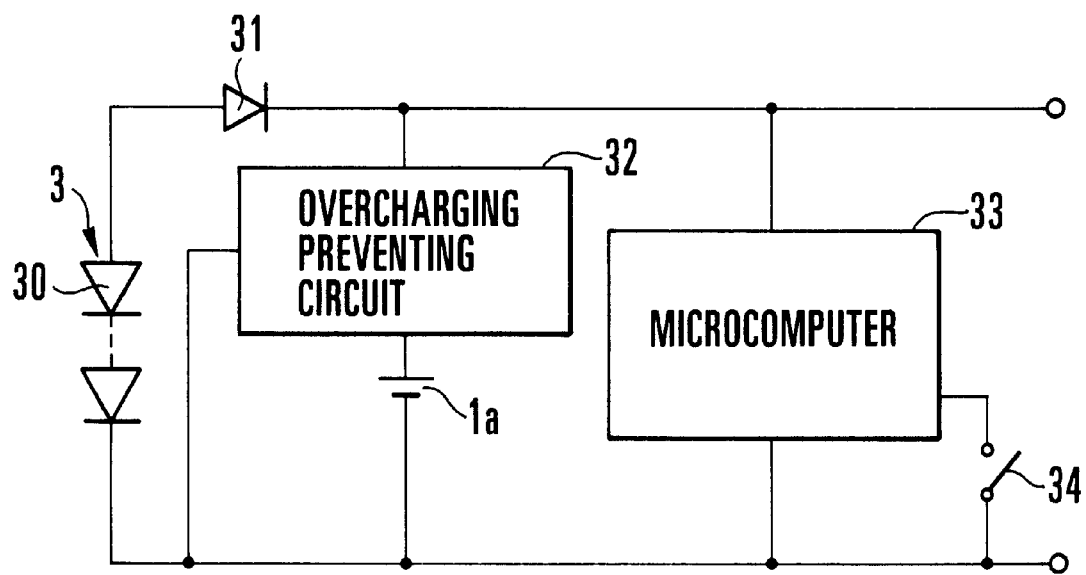
FIG. 6 is a schematic view of the power source portion of the camera.

FIG. 1 is an exploded perspective view of the camera according to the first embodiment of the present invention, and mainly shows the internal mechanism of a grip cover (first cover). In FIG. 1, the grip cover is represented by two-dot chain lines and the camera is shown in partly transparent form for convenience sake. FIG. 2 is an exploded perspective view of the camera, and mainly shows an arrangement for urging a solar cover (second cover) in a closing direction with respect to the grip cover (first cover). FIGS. 3(a) and 3(b) are side elevational views showing the internal portion of the grip cover in partly transparent form, similarly to FIG. 1. FIG. 3(a) shows a state in which the grip cover is closed so that a user can normally carry the camera. FIG. 3(b) shows a state in which the grip cover is opened as the camera is heated to a high temperature by exposure to the direct rays of the sun. FIGS. 4(a) to 4(c) are schematic side elevational views of the camera. FIG. 4(a) shows a state in which the solar cover is closed so that the user can normally carry the camera. FIG. 4(b) shows a state in which the grip cover is opened as the temperature of the camera rises and the solar cover is also opened in accordance with the opening of the grip cover. FIG. 4(c) shows a photography-enabled state in which the solar cover is independently opened. FIG. 5 is an explanatory view of a cam for urging the solar cover (second cover). FIG. 6 is a circuit diagram of the power source portion of the camera.

The construction of the camera shown in FIGS. 1 to 6 will first be described below. A camera body 1 includes a lithium-ion secondary battery 1a provided in built-in form at the position shown by dashed lines in FIG. 1, and a barrel-retracting type of photographing lens barrel 1b.

Five solar battery cells 3 each of which is made from amorphous silicon are attached to a solar cover 2 in such a manner as to extend thereon in parallel with one another. As shown in FIG. 6, the solar battery cells 3 are connected in series, and are arranged to supply electrical power to the lithium-ion secondary battery 1a when illuminated with light.

The camera body 1 also includes a grip cover 4 and a bottom cover 5 having hinge portions 5a, 5b and 5c. The solar cover 2, the grip cover 4 and the bottom cover 5 are joined by a hinge shaft 6 fitted in these three components, whereby the solar cover 2 and the grip cover 4 are supported for rotation about the hinge shaft 6. The bottom cover 5 on which the solar cover 2 and the grip cover 4 are supported for rotation about the hinge shaft 6 is fixed to the bottom of the camera body 1 by means of screws. A cam follower 7 is fitted in a hole 2a provided in the solar cover 2, and a key 7a is engaged with a key groove 2b of the solar cover 2 to prevent rotation of the cam follower 7. The cam follower 7 has a through-hole 7b through which the hinge shaft 6 is inserted in such a manner that the cam follower 7 can rotate and axially slide with respect to the hinge shaft 6.

A compression spring 8 has an urging force which acts to press a cam abutment portion 7c of the cam follower 7 against cam faces 4a to 4c integrally provided on the grip cover 4. The compression spring 8 is accommodated in the hole 2a of the solar cover 2 together with the cam follower 7. When the solar cover 2 is placed in its closed position (the state shown FIG. 4(a)), the cam abutment portion 7c of the cam follower 7 is pressed against the cam face 4a, whereby the solar cover 2 is urged in a closing direction (the direction indicated by an arrow A in FIG. 2) with respect to the grip cover 4 and an oblique face 2c of the solar cover 2 is maintained in abutment with an oblique face 4d of the grip cover 4.

A switch actuating member 9 is axially slidably fitted on the hinge shaft 6 similarly to the cam follower 7. A compression spring 10 has an urging force which acts to press a cam abutment portion 9a of the switch actuating member 9 against a cam face (not shown) integrally provided on the solar cover 2. The switch actuating member 9 is arranged to move toward the right as viewed in FIG. 2 in accordance with the opening movement of the solar cover 2 and toward the left by the spring force of the compression spring 10 in accordance with the closing movement of the solar cover 2. A switch plate 11 has contacts 12 and 13 retained by heat caulking, and is arranged to move toward the right and the left integrally with the switch actuating member 9 with an engagement portion 11a being engaged with a recess portion 9b of the switch actuating member 9. The contacts 12 and 13 are in contact with the pattern of a printed wiring board (not shown), and are operative to turn on or off a power source according to the rightward or leftward movement of the switch plate 11. The contacts 12 and 13 constitute a main switch 34 shown in FIG. 6.

A mechanism which is disposed inside the grip cover 4 will be described below with reference to FIGS. 1 and 2. Pulleys 15 and 16 are respectively supported for rotation about shafts 14a and 14b of a grip base plate 14 with washers 17 and 18 being respectively fixed to the shafts 14a and 14b by heat caulking. A shape memory alloy wire 19 made of Ni-Ti is fastened to an adjustment plate 20 at one end and to a cylindrical collar 21 at the other end. A latch claw 22 is supported for rotation about a shaft 14c of the grip base plate 14, and is retained by a grip ring 23 so as not to come off the shaft 14c.

The collar 21 to which the shape memory alloy wire 19 is fastened at one end is engaged with a recess provided in an arm 22a of the latch claw 22, and the shape memory alloy wire 19 is passed over the pulleys 15 and 16 along the inside face of the grip cover 4. The adjustment plate 20 to which the shape memory alloy wire 19 is fastened at the other end is supported for rotation about a shaft 14d of the grip base plate 14. The adjustment plate 20 is fixed to the grip base plate 14 by a screw after the tension of the shape memory alloy wire 19 has been adjusted. A tension spring 24 is disposed between an arm 22b of the latch claw 22 and a dowel 14e of the grip base plate 14 to urge the latch claw 22 in the counterclockwise direction with the latch claw 22 being held in the state shown in FIG. 1 by a stopper 14f. A limiting plate 25 is provided for limiting the angle of opening of the grip cover 4. The limiting plate 25 is supported at a hole 25a for rotation about a dowel 14g of the grip base plate 14, and a slot 25b is engaged with a dowel 1c of the camera body 1. The grip base plate 14 having the above-described mechanism is held on the back and side faces of the grip cover 4 by screws (not shown).

A torsion spring 26 serves to urge the grip cover 4 to open in a direction away from the camera body 1. Normally, a user carries the camera with a claw portion 22c of the latch claw 22 being held in engagement with a claw engagement portion 1d of the camera body 1 by the charged urging force of the torsion spring 26, i.e., with the grip cover 4 being closed in the state shown in FIG. 3(a). If the camera is exposed to intense sunlight, the temperatures of the solar battery cells 3 and the grip cover 4 become higher, so that the shape memory alloy wire 19 is deformed and shrinks to its memorized length. Thus, the latch claw 22 is made to turn in the clockwise direction against the spring force of the tension spring 24, whereby the claw portion 22c disengages from the claw engagement portion 1d of the camera body 1. When the claw portion 22c disengages from the claw engagement portion 1d, the grip cover 4 opens by the spring force of the torsion spring 26, and is made to stop when one end of the slot 25b of the limiting plate 25 comes into abutment with the dowel 1c and the opening angle of the grip cover 4 reaches approximately 250 (the state shown in FIG. 3(b)).

The side face of the grip cover 4 has a hole 4e, and a manual release knob 27 is fitted in the hole 4e in such a manner as to be slidable forward and backward. When the user slides the manual release knob 27 backward as viewed in FIG. 1, an arm 22d of the latch claw 22 is pressed, so that the claw portion 22c can be disengaged from the claw engagement portion Id of the camera body 1.

FIG. 6 is a block diagram showing the power source portion of a circuit suited to the camera according to the present embodiment. The power source portion includes a solar battery 30, the lithium-ion secondary battery 1a, a diode 31 for preventing a reverse current, a known overcharging preventing circuit 32, a microcomputer 33 for controlling the camera body 1, and the main switch 34 which is turned on when the solar cover 2 is opened.

The operation of the camera having the above-described construction will be described below. Normally, the user carries the camera with the solar cover 2 and the grip cover 4 being closed as shown in FIGS. 3(a) and 4(a), so that the solar battery cells 3 are exposed to external light to charge the lithium-ion secondary battery 1a with electricity. As described previously, when the solar cover 2 and the grip cover 4 are in their closed states, the shape memory alloy wire 19 is expanded by the force of the tension spring 24 and the latch claw 22 is engaged with the claw engagement portion id of the camera body 1.

In addition, the cam abutment portion 7c of the cam follower 7 fitted in the solar cover 2 is pressed by the cam face 4a of the grip cover 4, whereby the solar cover 2 is urged in the closing direction. As the solar cover 2 urged in this manner is opened by hand for the purpose of photography, the cam abutment portion 7c climbs up the cam face 4a while charging the compression spring 8, as shown in FIG. 5. When the cam abutment portion 7c is located in an area "a" of FIG. 5, an urging force is applied to the solar cover 2 in the closing direction. When the cam abutment portion 7c is located in an area "b", no urging force is applied to the solar cover 2 in either of the opening and closing directions (the state shown by dashed lines in FIG. 4(c)). When the cam abutment portion 7c enters an area "c", a force which urges the solar cover 2 in the opening direction is produced.

Accordingly, the fluctuation of the solar cover 2 is suppressed even when the solar cover 2 is located at a photographing position where it is fully opened. As the solar cover 2 is opened, the switch actuating member 9 climbs up a cam face (not shown) integrally provided on the solar cover 2 while charging the compression spring 10, and travels toward the right as viewed in FIG. 2 and turns on the main switch 34 in accordance with a switching pattern of the printed wiring board which is in contact with the contact 12. When the main switch 34 is turned on, the photographing lens barrel 1b moves forward from its barrel-retracted state to its photography standby position, as shown in FIG. 4(c), so that photography becomes possible. Contrarily, as the solar cover 2 is closed, the switch actuating member 9 travels toward the left by the spring force of the compression spring 10 and the main switch 34 is turned off, whereby the photographing lens barrel 1b is retracted. Even during the aforesaid movement of the solar cover 2 for the purpose of photography, the grip cover 4 is maintained in the closed state with respect to the camera body 1.

The following description is made in connection with the operation of the aforesaid camera which is capable of coping with a temperature rise which may occur while the user is charging the secondary battery of the camera in direct sunshine.

According to the experiment made by the present inventor, it has been found out that the temperature of the interior of a vehicle which is parked in fine weather in an area near to the equator (for example, Malaysia) reaches approximately 90° at or near the dashboard and the average air temperature of the interior reaches as high as 52° C.

If the camera is placed in such an environment in the state shown in FIG. 4(a), the temperature of the solar battery cells 3 of the solar cover 2 will rise above 90° C. in approximately one hour, and the temperature of the air layer between the solar cover 2 and the camera body 1 and that of the front face of the camera body 1 will rise to an excessively high temperature of approximately 85° C. (Since the thickness of the air layer can only be made as large as approximately several millimeters in terms of portability, the speed at which a convection current of fresh air flows in the air layer is restricted to only several millimeters per second owing to the viscous resistance of air to the back face of the solar cover 2 and the front face of the camera body 1. For this reason, when the camera is in the state of FIG. 4(a), the effect of cooling the back face of the solar cover 2 is low.) As a result, not only will the components of the camera body 1 be damaged, but also the temperature of the aforesaid lithium-ion secondary battery 1a will rise above 65° C., and the temperature of film may also rise above 60° C.

As will be described below, the camera according to the present embodiment is capable of preventing occurrence of the above-described dangerous state.

If the camera is placed in direct sunshine in the states shown in FIGS. 3(a) and 4(a), the temperatures of the solar cover 2 and the grip cover 4 as well as the temperature of the solar battery cells 3 rise. Particularly when the camera is exposed to a severe environment such as the aforementioned one, the temperature of the grip cover 4 becomes equal to or higher than 65° C. in approximately twenty minutes. Then, the shape memory alloy wire 19 made of Ni—Ti is deformed and shrinks to cause the latch claw 22 to turn in the clockwise direction against the spring force of the tension spring 24, thereby disengaging the claw portion 22c from the claw engagement portion id of the camera body 1. Then, the grip cover 4 is opened by an opening angle of approximately 25° by the spring force of the torsion spring 26, so that the end of the slot 25b of the limiting plate 25 comes into abutment with the dowel 1c (the state shown in FIG. 3(b)). With the opening movement of the grip cover 4, the oblique face 4d of the grip cover 4 presses the oblique face 2c of the solar cover 2 upwardly, so that the solar cover 2 is also opened by an opening angle equal to that of the grip cover 4 (the state shown in FIG. 4(b)). Oblique face 4d of the grip cover 4 may thus be viewed as an association device which causes solar cover 2 to open in association with opening of grip cover 4, but not causing grip cover 4 to open in association with solar cover 2 when solar cover 2 opens. Since the solar cover 2 is urged via the cam follower 7 in the closing direction with respect to the grip cover 4, the torsion spring 26 needs only have a sufficient force to press the grip cover 4 and the solar cover 2 upwardly. When the camera is in the state shown in FIGS. 3(b) and 4(b), the air layer between the solar cover 2 and the camera body 1 becomes not less than 15 mm thick (with respect to the original several millimeters), so that the exposure of the air layer to the convection current of fresh air (a maximum of 52° C.) is promoted. Accordingly, the solar cover 2 and the front face of the camera body 1 are cooled and, in particular, the temperature of the front face of the camera body 1, which is covered with the shades of the solar cover 2 and the grip cover 4 which have been popped up, falls to a temperature approximately equal to the air temperature of the interior of the vehicle. In addition, since the solar battery cells 3 continue to absorb the energy of the sunshine, the temperature of the solar cover 2 rises to a further extent, but does not exceed the aforementioned 90° C., because the back face of the solar cover 2 is cooled by fresh air.

In addition, the lithium-ion secondary battery 1a which is easily affected by high temperatures is disposed in the camera body 1 in an area thereof which can be covered with the shade of the grip cover 4, so that even if the user erroneously places the camera under the light of the sun with the solar cover 2 being fully open, the outside portion of the camera body 1 which is adjacent to the lithium-ion secondary battery 1a built therein is prevented from being exposed to the direct rays of the sun. Accordingly, the lithium-ion secondary battery 1a behind that outside portion is prevented from being heated to a high temperature.

In addition, since film is laid in a back portion of the camera body 1, the temperature of the film only rises to a practically allowable temperature (experimentally, approximately 45° C.), so that the film practically does not suffer any problem.

Even after the camera has been left in the above-described environment for several days, if the user does not forget to carry the camera out of the vehicle, fresh air (in many cases, 40° C. or less) flows into the space between the camera body 1 and the solar cover 2 which is located away from the camera body 1 in the popped-up state, and rapidly cools the shape memory alloy wire 19.

The shape memory alloy wire 19 is designed in the following manner. when its temperature falls below 55° C., the shape memory alloy wire 19 starts to restore the original shape by expansion, and when the tension of the shape memory alloy wire 19 is restored to ⅓, the rotational force of the tension spring 24 exceeds the tension. Accordingly, when the temperature of the shape memory alloy wire 19 falls below 55° C., the latch claw 22 is rotated counterclockwise and returns toward the camera body 1. When the user depresses the grip cover 4 with the latch claw 22 being rotated counterclockwise in this manner, the claw portion 22c of the latch claw 22 engages with the claw engagement portion 1d and the camera is again brought into the compact and portable state shown in FIG. 3(a).

Figure 7A:
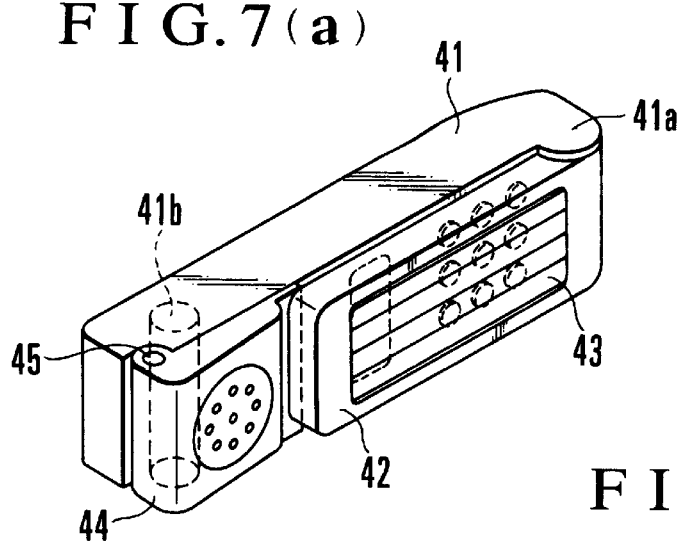
FIG. 7(a) is a perspective view of a portable telephone according to a second embodiment of the present invention, showing a state in which a solar cover 42 is located close to a portable-telephone body 41.
Figure 7B:
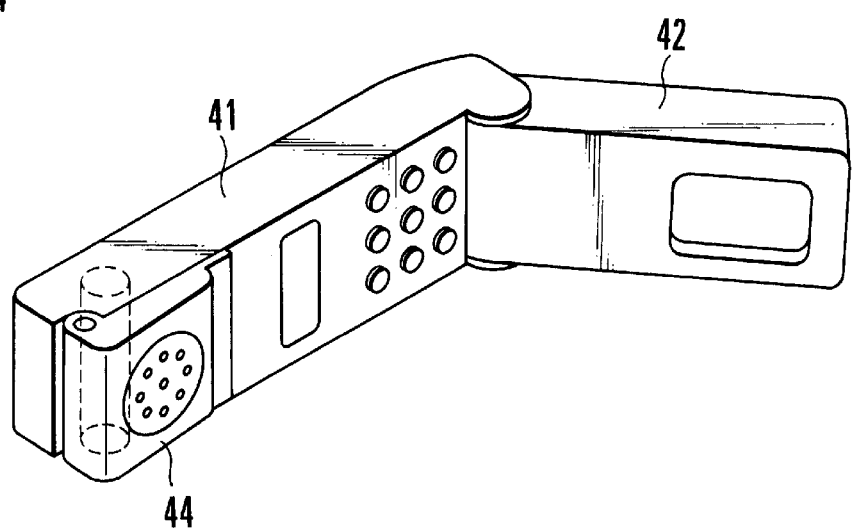
FIG. 7(b) is a perspective view of the portable telephone, showing a state in which the solar cover 42 is located away from the portable-telephone body 41.

FIGS. 7(a) and 7(b) show one example of a portable telephone to which a second embodiment of the present invention is applied.

FIG. 7(a) shows a state in which a solar cover 42 is closed, while FIG. 7(b) shows a state in which the solar cover 42 is opened and a conversation is enabled.

The solar cover 42 is rotatably supported by a hinge portion 41a of a portable-telephone body 41, and a solar battery 43 is provided on the outside surface of the solar cover 42.

A secondary battery 41b provided in the portable-telephone body 41 is arranged to be charged with the electrical power generated by the solar battery 43.

A first cover 44 is provided for covering a portion in which the secondary battery 41b is present, and is normally maintained in its closed state. The first cover 44 corresponds to the grip cover 4 of the camera according to the above-described first embodiment, and has a temperature sensor, such as a shape memory alloy wire, in its inside. only when the temperature sensor detects a high temperature, the first cover 44 opens on a hinge 45 by a predetermined angle.

Figure 8:
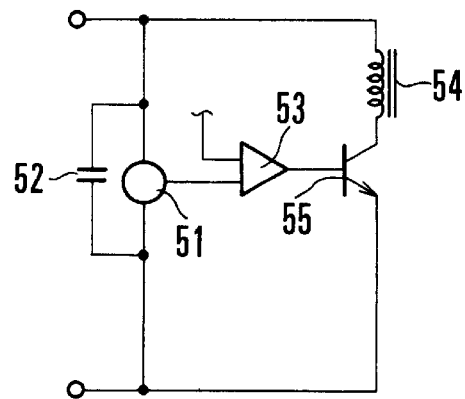
FIG. 8 is a diagram showing a modification which relates to temperature detecting means and solar-cover moving means.

FIG. 8 shows a partial modification of the first embodiment in which a temperature sensor, such as a thermistor, and an electromagnet are used in place of the shape memory alloy wire which is used as temperature-sensitive moving means in the first embodiment. The arrangement shown in FIG. 8 includes a temperature sensor 51, such as a thermistor or a bimetal, a capacitor 52, a comparator 53, an electromagnet 54 and a transistor 55. When the output from the temperature sensor 51 exceeds a reference level, the comparator 53 provides a high-level output. The electromagnet 54 is provided for releasing the engagement of the latch claw 22 of FIG. 1. An armature (not shown) is attached to the claw portion 22c of the latch claw 22, and when the electromagnet 54 attracts the armature, the engagement of the latch claw 22 is released.

In operation, when the temperature sensor 51 detects a temperature of not less than a predetermined value, the output from the output terminal of the temperature sensor 51 exceeds a predetermined value, and the output of the comparator 53 goes to its high level and the high-level signal is inputted to the base of the transistor 55. The transistor 55 allows an electric current to flow and causes the electromagnet 54 to attract the armature, thereby releasing the engagement of the latch claw 22 and allowing the grip cover 4 to pop up. Accordingly, the temperature of the camera body 1 is lowered by air which flows through the space between the grip cover 4 and the camera body 1.

Although each of the above-described first and second embodiments uses a shape memory alloy as temperature detecting means and engagement releasing means, a shape memory alloy may, of course, be used as an assembly of temperature detecting means and cover driving means. As a matter of course, not only may the shape memory alloy be used as the temperature detecting means, but also it is possible to use various other elements, such as an element which produces a mechanical motion by exhibiting a characteristic variation due to a temperature variation (i.e., temperature sensitive moving means) or an element which exhibits a non-mechanical variation according to a temperature variation (i.e., simple temperature detecting means).

Another driving source, such as a motor, may also be used as a drive source for opening a cover, such as the first or second cover.

In each of the first and second embodiments, the first cover may also be arranged to cover operating parts which are not frequently used.

Although the first embodiment is arranged in such a manner that the second cover opens whenever the first cover opens, it is also possible to adopt an arrangement in which the first cover can open alone.

Although in each of the first and second embodiments the first cover is arranged to open by a predetermined small amount, the first cover may also be arranged to be able to open by an arbitrary amount, as required.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

The individual components shown in schematic or block form in the drawings are all well-known in the camera arts and their specific construction and operation are not critical to the operation or best mode for carrying out the invention.

The present invention can also be carried out by combining the above-described embodiments or technical elements thereof with each other, as required.

The present invention can be applied to other kinds of arrangements. For example, the whole or part of the arrangement set forth herein or in the appended claims may constitute one apparatus, or may be connected to other apparatus, or may constitute an element which forms part of another apparatus.

The present invention can also be applied to various types of cameras such as a single-lens reflex camera, a lens shutter camera or a video camera, optical apparatuses other than such cameras, apparatuses other than the optical apparatuses, apparatuses applied to the cameras or the optical or other apparatuses, or elements which constitute part of such apparatuses.

What is claimed is:

1. An apparatus adapted for a solar battery, comprising:
   (A) a first cover;
   (B) a second cover;
   (C) an opening device for opening automatically said first cover when a temperature rise occurs;
   (D) an association device which causes said second cover to open in association with said first cover when said first cover is opened by said opening device opens, said association device not causing said first cover to open with said second cover when said second cover is opened by a user's operation; and
   (E) a switch which supplies electric power to a circuit when said second cover is opened by a user.

2. An apparatus according to claim 1, wherein said apparatus includes an electronic apparatus.

3. An apparatus according to claim 1, wherein said apparatus includes a camera.

4. An apparatus according to claim 1, wherein said apparatus includes a telephone.

5. An apparatus according to claim 1, wherein said second cover includes a protection cover.

6. An apparatus according to claim 1, wherein said second cover includes a protection cover for an optical member.

7. An apparatus according to claim 1, wherein said solar battery is provided at said second cover.

8. An apparatus according to claim 1, wherein said first cover includes a cover for covering an operating part of said apparatus.

9. An apparatus according to claim 1, further comprising a second opening device for opening both of said first and second covers by manual operation.

10. An apparatus according to claim 1, wherein said opening device includes a shape memory member which moves with temperature.

11. An apparatus according to claim 1, wherein said opening device is a temperature detecting sensor.

12. An apparatus according to claim 1, wherein said opening device includes means for holding said second cover open by a small amount compared to a state in which said cover is held open without using said opening device.

13. An apparatus applied to a device adapted for a solar battery, comprising:
    (A) a first cover provided on said device;
    (B) a second cover provided on said device;
    (C) an opening device for opening automatically said first cover when a temperature rise occurs;
    (D) an association device which causes said second cover to open in association with said first cover when said first cover is opened by said opening device, said association device not causing said first cover to open in association with said second cover when said second cover is opened by a user's operation; and
    (E) a switch which supplies electric power to a circuit when said second cover is opened by a user.

14. An apparatus according to claim 13, wherein said device includes an electronic apparatus.

15. An apparatus according to claim 13, wherein said device includes a camera.

16. An apparatus according to claim 13, wherein said device includes a telephone.

17. An apparatus according to claim 13, wherein said second cover includes a protection cover.

18. An apparatus according to claim 13, wherein said second cover includes a protection cover for an optical member.

19. An apparatus according to claim 13, wherein said solar battery is provided at said second cover.

20. An apparatus according to claim 13, wherein said first cover includes a cover for covering an operating part of said apparatus.

21. An apparatus according to claim 13, further comprising a second opening device for opening both of said first and second covers by manual operation.

22. An apparatus according to claim 13, wherein said opening device includes a shape memory member which moves with temperature .

23. An apparatus according to claim 13, wherein said opening device is a temperature detecting sensor.

24. An apparatus according to claim 13, wherein said opening device includes means for holding said second cover open by a small amount compared to a state in which said cover is held open without using said opening device.

* * * * *

UNITED STATES PATENT AND TRADEMARK OFFICE
CERTIFICATE OF CORRECTION

PATENT NO. : 6,094,540
DATED : July 25, 2000
INVENTOR(S) : Hiroshi Kikuchi

It is certified that error appears in the above-identified patent and that said Letters Patent is hereby corrected as shown below:

Column 5,
Line 16, delete "250" and insert -- 25° --.
Line 24, delete "Id" and insert -- 1d --.

Column 6,
Line 59, delete "id" and insert -- 1d --.

Column 7,
Line 49, delete "when" and insert -- When --.

Column 8,
Line 13, delete "only" and insert -- Only --.

Column 9,
Line 43, after "device" delete -- opens --.

Signed and Sealed this

Twentieth Day of November, 2001

Attest:

*Nicholas P. Godici*

NICHOLAS P. GODICI
*Attesting Officer*  *Acting Director of the United States Patent and Trademark Office*